United States Patent
Elwart et al.

(10) Patent No.: US 8,192,877 B2
(45) Date of Patent: Jun. 5, 2012

(54) SYSTEM AND METHOD TO OPERATE FUEL CELL IN THE EXHAUST OF AN INTERNAL COMBUSTION ENGINE

(75) Inventors: Shane Elwart, Ypsilanti, MI (US); James Kerns, Trenton, MI (US); Gopichandra Surnilla, West Bloomfield, MI (US); David Bidner, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1193 days.

(21) Appl. No.: 11/354,610

(22) Filed: Feb. 14, 2006

(65) Prior Publication Data

US 2007/0186876 A1    Aug. 16, 2007

(51) Int. Cl.
*H01M 8/06* (2006.01)
*H01M 8/04* (2006.01)

(52) U.S. Cl. ......... 429/408; 429/415; 429/428; 429/430

(58) Field of Classification Search .......................... None
See application file for complete search history.

(56) References Cited

U.S. PATENT DOCUMENTS

| | | | |
|---|---|---|---|
| 7,600,375 B2 | 10/2009 | Elwart et al. | |
| 2004/0053087 A1 | 3/2004 | Akikusa et al. | |
| 2004/0126640 A1 | 7/2004 | Sanderson | |
| 2004/0177607 A1* | 9/2004 | Suzuki et al. | 60/286 |
| 2005/0193988 A1* | 9/2005 | Bidner et al. | 123/481 |
| 2006/0063046 A1* | 3/2006 | Hu et al. | 429/17 |
| 2007/0186537 A1 | 8/2007 | Elwart et al. | |
| 2007/0186545 A1 | 8/2007 | Elwart et al. | |
| 2007/0190377 A1 | 8/2007 | Elwart et al. | |

FOREIGN PATENT DOCUMENTS

JP    2002-175824    6/2002

* cited by examiner

*Primary Examiner* — Barbara Gilliam
*Assistant Examiner* — Kwang Han
(74) *Attorney, Agent, or Firm* — Allan J. Lippa; Alleman Hall McCoy Russell & Tuttle LLP

(57) ABSTRACT

An exhaust emission reduction system of a vehicle having an internal combustion engine with an at least one cylinder coupled to an exhaust system comprises a NOx reduction catalyst disposed in the exhaust system downstream of the engine exhaust system; and a fuel cell disposed in the exhaust system downstream of the NOx reduction catalyst.

16 Claims, 11 Drawing Sheets

12# SYSTEM AND METHOD TO OPERATE FUEL CELL IN THE EXHAUST OF AN INTERNAL COMBUSTION ENGINE

FIELD

The present application relates to a system and method to operate a fuel cell in the exhaust of an internal combustion engine, and more specifically to a system and method to reduce the emissions.

BACKGROUND

Internal combustion engines use only a portion (for example, approximately 31% to 38% in some cases) of the supplied fuel energy due to heat wasted, friction, incomplete combustion, and others. In addition, approximately 3-17% of the supplied fuel energy can be used to maintain the engine operation during standby and another 1-2% can be used to operate accessories. Therefore, it can be advantageous to utilize the waste energy, typically in the form of thermal and chemical energy, to improve the overall vehicle system fuel efficiency.

One approach uses a solid oxide fuel cell (SOFC) arranged in an exhaust system of an internal combustion engine, such as described in U.S. 2004/0177607. In the '607 reference, a power generation fuel can be supplied to the fuel cell by a fuel supply system downstream of the engine and upstream of the fuel cell so that electricity can be generated without depending on the operation condition of the engine. Some embodiments of the 607' reference include an oxidation catalyst upstream and downstream of the SOFC. The upstream oxidation catalyst is used to oxidize unburnt fuel from the engine, thus raising temperature of the exhaust gas discharged from the engine. Another role of the upstream catalyst is to reform unburnt fuel. The downstream oxidation catalyst is used to oxidize fuel discharged from the SOFC without undergoing reactions.

However, the inventors herein have recognized several disadvantages of such an approach. For example, the NOx emissions may not meet the related regulations since neither the upstream nor the downstream oxidation catalyst is aimed at reducing the NOx emissions. Further, some fuel reformed in the engine such as hydrocarbon and carbon monoxide may be oxidized in the oxidation catalyst, and thus cannot be used as effectively for power generation fuel for the SOFC.

Furthermore, the inventors herein have recognized that since '607 approach operates engine independent of the fuel cell, there are conditions that energy from engine may be wasted to a great extent and emissions from the system may not meet the standards.

SUMMARY

At least some of the above disadvantages may be address by an exhaust emission reduction system of a vehicle having an internal combustion engine with an at least one cylinder coupled to an exhaust system. The system comprises a NOx reduction catalyst disposed in the exhaust system downstream of the engine exhaust system; and a fuel cell disposed in the exhaust system downstream of the NOx reduction catalyst.

In this way, the NOx emissions are reduced in the catalyst designed to reduce NOx. Further, since the NOx reduction catalyst is in the oxygen deficient environment when the engine operates rich, the NOx reduction reaction is favored. Furthermore, the reaction is exothermic reaction, thus raising the temperature of the exhaust from the engine exhaust manifold to a level optimum for the operation of fuel cell.

According to another aspect, a method to operate an emission reduction system of a vehicle is provided. The vehicle also includes an internal combustion engine having multiple cylinders, an exhaust system, a NOx reduction catalyst disposed downstream of the exhaust system, a fuel cell disposed downstream of the NOx reduction catalyst. The method comprises adjusting the air/fuel ratio of the engine to vary an exhaust air fuel ratio in response to an operating condition of the fuel cell.

This approach provides various advantages. Specifically, the engine may be operated dependent on an operating condition of the fuel cell. In one embodiment, the operation condition of the fuel cell may be exhaust information such as air/fuel ratio of the exhaust after the fuel cell. By adjusting the air/fuel ratio of the engine, the emissions from the fuel cell may be decreased. In this way, the fuel cell may be used as an emission control device to reduce HC and/or CO emissions. Thus, while the engine operates as a primary power source, the engine may also be adjusted so that the emissions may be sufficiently controlled in a fuel cell.

According to yet another aspect, a method to operate an emission reduction system of a vehicle is provided. The vehicle also includes an internal combustion engine having multiple cylinders coupled to an intake manifold, an exhaust manifold, a NOx reduction catalyst disposed downstream of the exhaust manifold, a fuel cell disposed downstream of the NOx reduction catalyst, and an oxidizing catalyst disposed downstream of the fuel cell. The method comprises adjusting an air/fuel ratio of engine to vary an exhaust air/fuel ratio in response to an operating condition of the fuel cell; and adjusting the amount of air entering into the oxidizing catalyst in response to an operating condition of the oxidizing catalyst.

Again, the system has various advantages. For example, since the engine operation depends on the conditions of the fuel cell and catalysts, the emissions may be minimized through controlling the engine operation.

DETAILED DESCRIPTION

Figure 1:
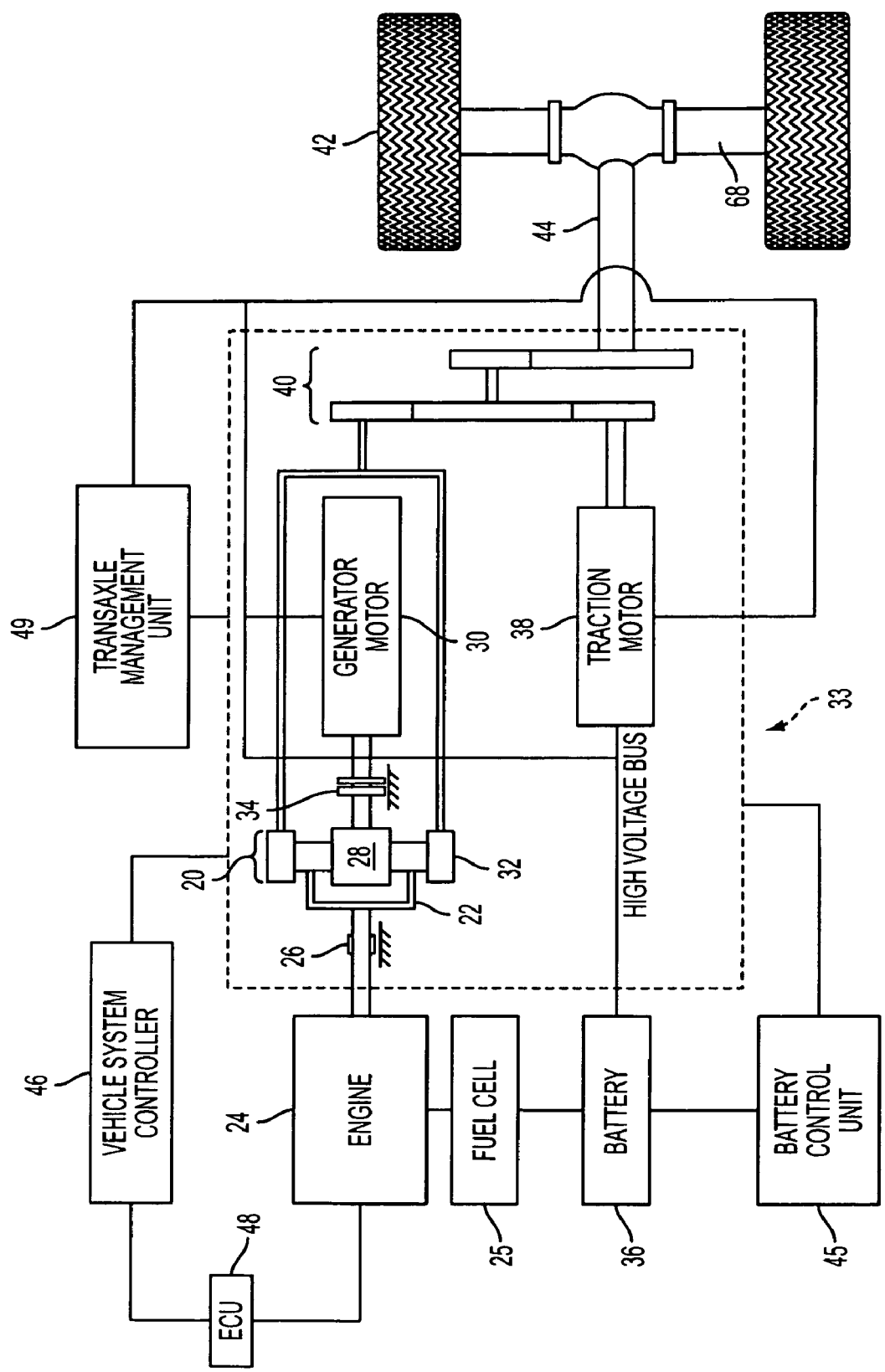
FIG. 1 is a schematic diagram of an engine in an example hybrid powertrain.

The system and method of the present application may be used in hybrid electric vehicles (HEVs). FIG. 1 demonstrates just one possible configuration, specifically a parallel/series hybrid electric vehicle (split) configuration. However, other hybrid configurations may be used, such as series, parallel, integrated starter-alternator, or others.

In an HEV, the engine 24 is coupled to the planet carrier 22 of planetary gear set 20. A one way clutch 26 allows forward rotation and prevents backward rotation of the engine and planet carrier. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

Fuel cell 25 is disposed in the exhaust system of engine 24. In addition, fuel cell 25 is electrically linked to battery 36.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

Thus, FIG. 1 shows that in this example, the engine 24 is attached directly to planet carrier 22, for example without a clutch that can disconnect them from each other. One way clutch 26 allows the shaft to rotate freely in a forward direction, but grounds the shaft to the powertrain's stationary structure when a torque attempts to rotate the shaft backwards. Brake 34 does not interrupt the connection between the sun gear 28 and the generator motor 30, but can, when energized, ground the shaft between those two components to the powertrain's stationary structure.

A vehicle system controller (VSC) 46 controls many components in this HEV configuration by connecting to each component's controller. An engine control unit (ECU) 48 connects to the Engine 24 via a hardwire interface (see further details in FIG. 2). In one example, the ECU 48 and VSC 46 can be placed in the same unit, but are actually separate controllers. Alternatively, they may be the same controller, or placed in separate units. The VSC 46 communicates with the ECU 48, as well as a battery control unit (BCU) 45 and a transaxle management unit (TMU) 49 through a communication network such as a controller area network (CAN) 33. The BCU 45 connects to the battery 36 via a hardwire interface. The TMU 49 controls the generator motor 30 and the traction motor 38 via a hardwire interface. The control units 46, 48, 45 and 49, and controller area network 33 can include one or more microprocessors, computers, or central processing units; one or more computer readable storage devices; one or more memory management units; and one or more input/output devices for communicating with various sensors, actuators and control circuits.

It should be appreciated that the system and method of the present application may be used in any other HEV configurations. Additional details and examples of engine 24 and fuel cell 25, as well as other components, are described in more detail below herein, such as in FIGS. 2-3.

Figure 2:
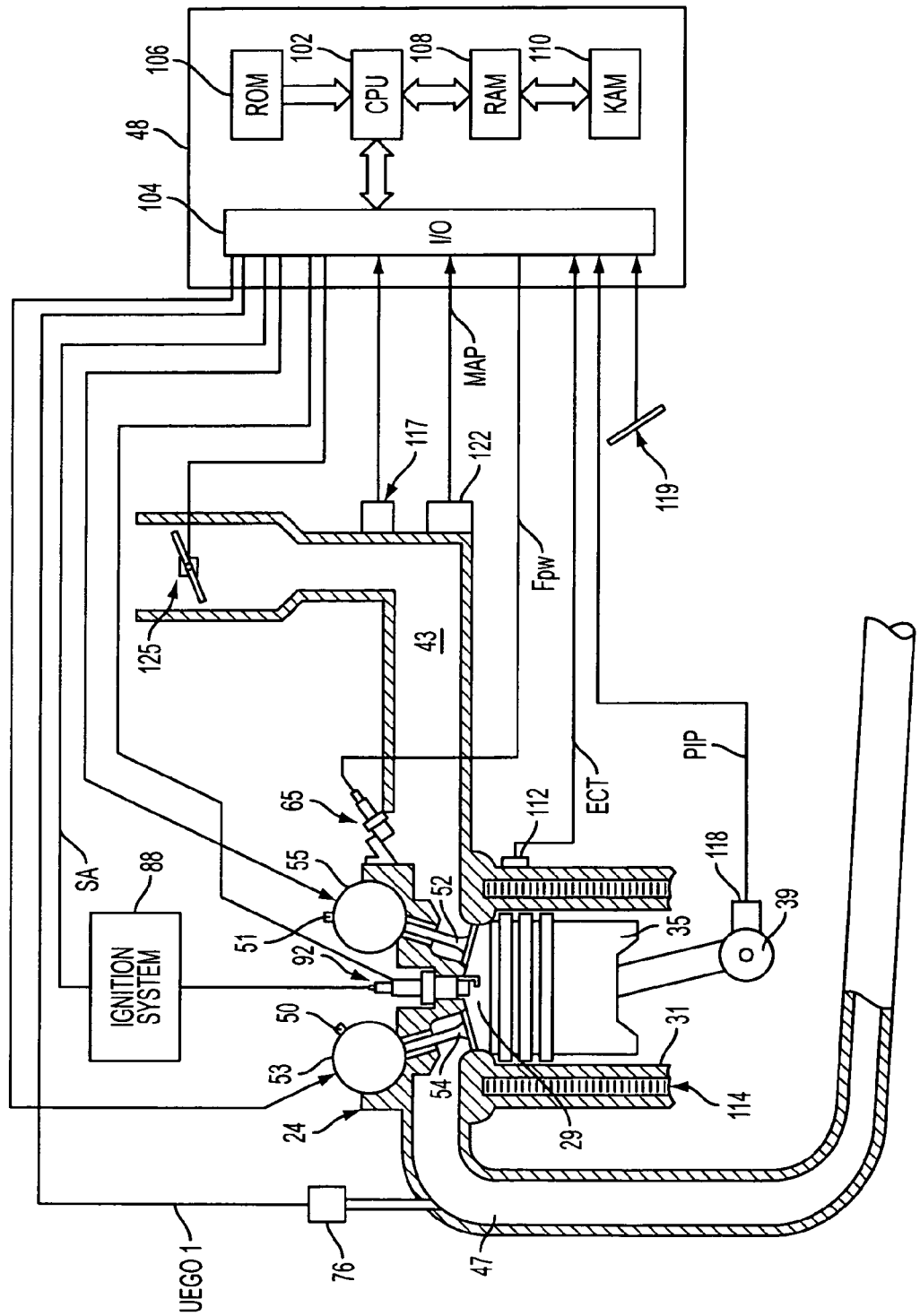
FIG. 2 is a schematic diagram of one embodiment of an internal combustion engine.

FIG. 2 is a schematic diagram of one embodiment of an internal combustion engine 24. Engine 24 may be a gasoline engine or a diesel engine, for example. Thus, the example of FIG. 2 shows a gasoline engine with a spark plug, however, engine 24 may be a diesel engine without a spark plug, or any other type of engine. Internal combustion engine 24, comprising a plurality of cylinders, one cylinder of which is shown in FIG. 2, is controlled by electronic engine controller 48. Engine 24 includes combustion chamber 29 and cylinder walls 31 with piston 35 positioned therein and connected to crankshaft 39. Combustion chamber 29 is shown communicating with intake manifold 43 and exhaust manifold 47 via respective intake valve 52 and exhaust valve 54. While only one intake and exhaust valve is shown, more than one may be used if desired. For example, two intake valves and a single exhaust may be used, or two intake and two exhaust valves may be used.

In this example, variable valve timing may be provided by variable cam timing. While in this example independent intake cam timing and exhaust cam timing is shown, variable intake cam timing may be used with fixed exhaust cam timing, or vice versa. Also, various types of variable valve timing may be used, such as the hydraulic vane-type actuators 53 and 55 receiving respective cam timing control signals VCTE and VCTI from controller 48. Cam timing (exhaust and intake) position feedback can be provided via comparison of the crank signal PIP and signals from respective cam sensors 50 and 51.

In an alternative embodiment, cam actuated exhaust valves may be used with electrically actuated intake valves, if desired. In such a case, the controller can determine whether the engine is being stopped or pre-positioned to a condition with the exhaust valve at least partially open, and if so, hold the intake valve(s) closed during at least a portion of the engine stopped duration to reduce communication between the intake and exhaust manifolds.

Intake manifold 43 is also shown having fuel injector 65 coupled thereto for delivering liquid fuel in proportion to the pulse width of signal FPW from controller 48. Fuel is delivered to fuel injector 65 by fuel system (not shown) including a fuel tank, fuel pump, and fuel rail (not shown). In addition, intake manifold 43 is shown communicating with optional electronic throttle 125.

Distributorless ignition system 88 provides ignition spark to combustion chamber 29 via spark plug 92 in response to controller 48.

Controller 48 is shown in FIG. 2 as a conventional microcomputer including: microprocessor unit 102, input/output ports 104, and read-only memory 106, random access memory 108, keep alive memory 110, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 43; a measurement (ACT) of engine air charge temperature or manifold temperature from temperature sensor 117; and an engine position sensor from a Hall effect sensor 118 sensing crankshaft 39 position. In one aspect of the present description, engine position sensor 118 produces a predetermined number of equally spaced pulses every revolution of the crankshaft from which engine speed (RPM) can be determined.

In an alternative embodiment, a direct injection type engine can be used where injector 65 is positioned in combustion chamber 29, either in the cylinder head similar to spark plug 92, or on the side of the combustion chamber.

Figure 3:
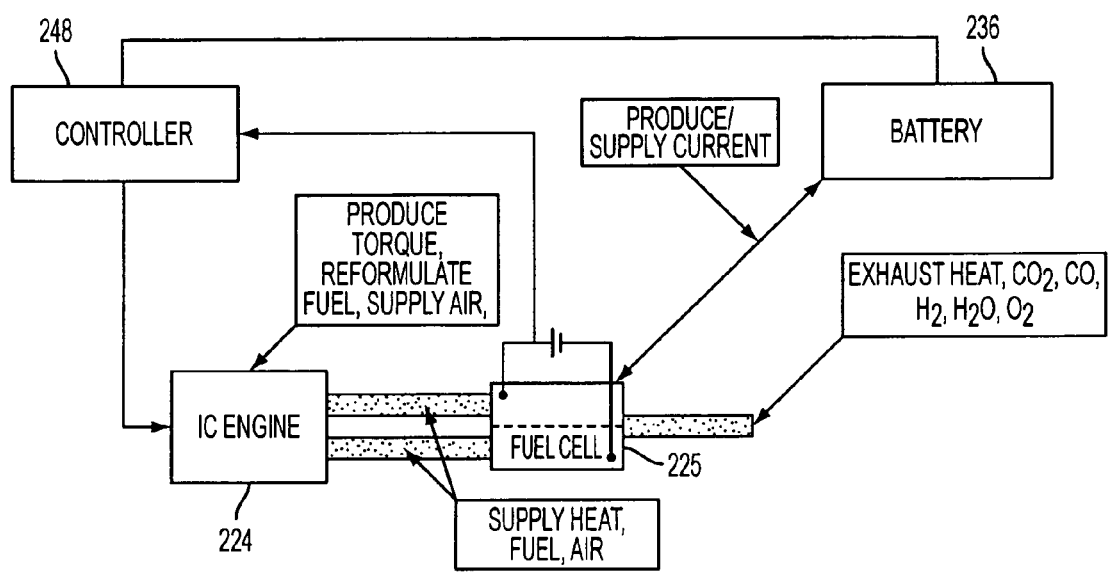
FIG. 3 is a schematic diagram of one embodiment of an exemplary system wherein the fuel cell is disposed in the exhaust of an engine.

FIG. 3 shows one embodiment of an exemplary engine system where the fuel cell 225 is disposed in the exhaust of the engine 224. Engine 224 may be an engine described in FIG. 2 and other internal combustion engines. Engine 224 and fuel cell 225 may be used in the exemplary HEV as described in FIG. 1 or in other HEV embodiments.

During engine operation, where the engine 224 combusts fuel and produces torque output, fuel energy unutilized for torque output may be discharged in the form of unburnt fuel, reformed fuel such as hydrogen and carbon monoxide (CO), and heat. In addition, oxygen may be contained in the exhaust depending on the air-fuel ratio, such as whether the engine operates lean or rich. In some examples, the richness of the engine air-fuel ratio may be adjusted to vary the amount of unburned and/or reformed fuel provided to fuel cell 225 based on conditions of the fuel cell, such as temperature, efficiency, etc. Further, in other embodiments, the engine may be adjusted to concurrently supply both fuel and oxygen to the fuel cell, such as by operating some cylinders lean and other cylinders rich.

As shown in FIG. 3, fuel cell 225 is disposed in the exhaust and downstream of engine 224. Fuel cell 225 may utilize fuel, air, and heat discharged from engine 224 to generate electrical power. Fuel cell 225 may be a solid oxide fuel cell (SOFC), molten carbonate fuel cell, proton exchange membrane (PEM) fuel cell, etc.

Some types of fuel cells may operate at temperatures higher than a room temperature. For example, the operating temperature for a SOFC may range approximately from 700 to 1,000° F. Fuels used in the reaction in the fuel cell may be reformed fuel such as hydrogen ($H_2$) and carbon monoxide (CO), among others. For example, in the case of a SOFC, at the anode or the fuel electrode, $H_2$ or CO reacts with oxygen ions transferred in the electrolyte to form $H_2O$ or $CO_2$ and releases four electrons. At the cathode or air electrode, the oxygen in the air obtains four electrons and becomes an oxygen ion. The oxygen ion moves toward the anode. Thus, current or electrical power is generated from the chemical reactions. The products of the fuel cell 225 may be $H_2O$, $CO_2$, oxygen, NOx generated from engine 224 as well as fuel such as CO and $H_2$ passing through the fuel cell 225 without reaction. In addition, exhaust heat may be released from fuel cell 225.

The current generated from fuel cell 225 may be stored in a battery, such as battery 236, or directly used to power electrical accessories of the vehicle, or directly provided to a motor to assist in engine rotation or in driving the vehicle's wheels.

In some embodiments, battery 236 may supply current to fuel cell 224 to determine the speciation of gas stream entering and exiting fuel cell 225 as described in detail herein. In one embodiment, fuel cell 225 and battery 236 are controlled by controller 248, which also controls engine operation as described in conjunction with FIG. 2. In another embodiment, fuel cell 225 and battery 236 may share a common controller. In yet another embodiment, each of fuel cell 225 and battery 236 may have an individual controller.

Engine 224 may be operated in a way that the fuel energy exhausted during engine operation can be sufficiently used by the downstream fuel cell 225. Alternatively, engine 224 may be operated to maintain an operation of the downstream fuel cell to generate a desired electrical power.

Figure 14:
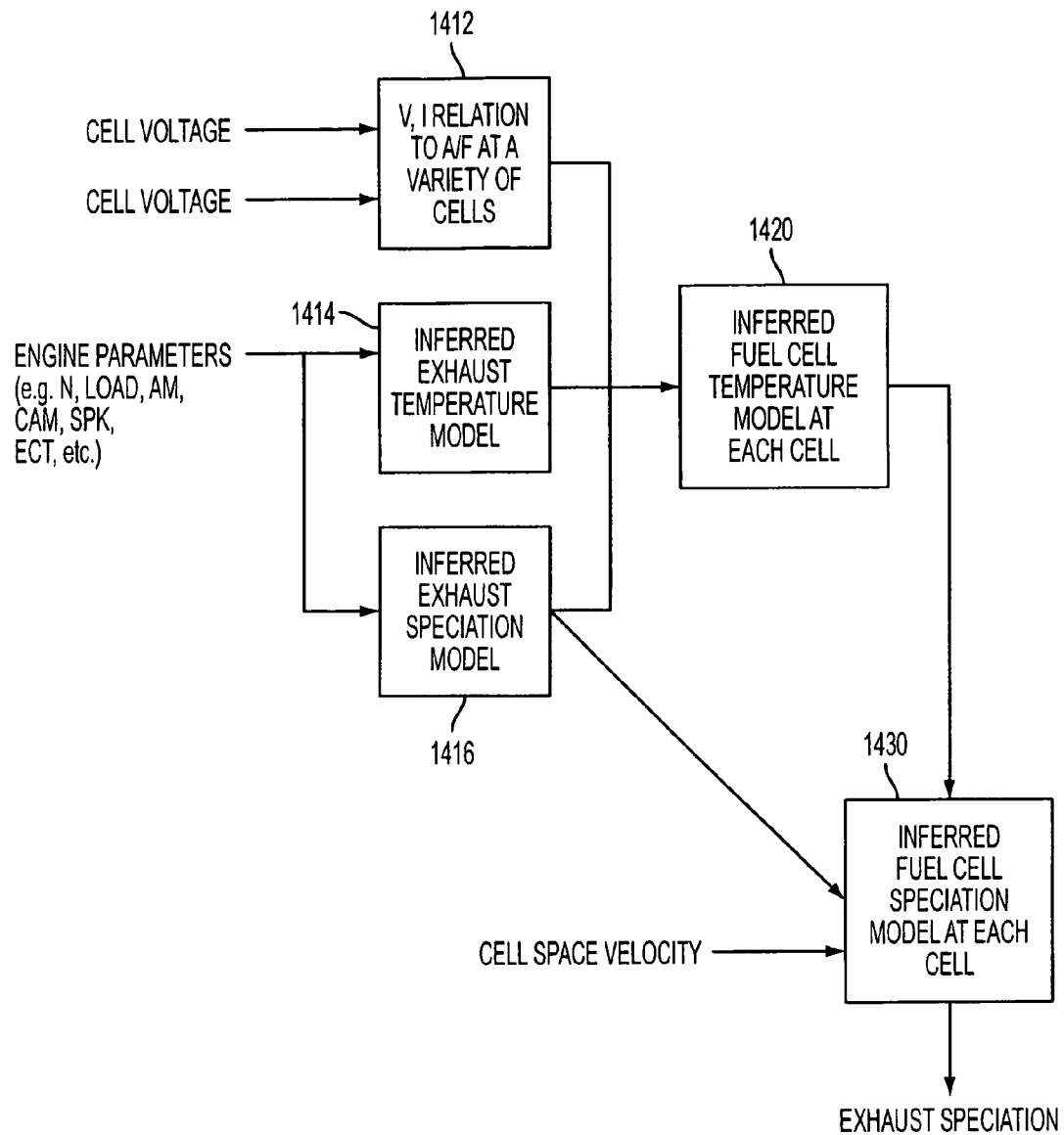
FIG. 14 is a schematic diagram of one embodiment of an exemplary system wherein the exhaust speciation is determined.

In addition to generate electric power, the fuel cell may provide information about the exhaust. For example, the speciation at each fuel cell may be determined by correlation between the modeled engine outputs of species in conjunction with modeled temperature at each fuel cell. Inclusion of an electrode across the catalytic diffusion layer and the fuel cell will provide a way to periodically apply a pumping current across a cell. FIG. 14 is a schematic diagram of one embodiment of an exemplary system wherein the exhaust speciation may be determined. The relationship of the applied pumping current at a cell or a variety of cells corresponding to the pumping voltage may change with the air/fuel ratio or related to the air/fuel ratio as shown at 1412. Therefore, in some embodiments, the pumping current/voltage relationship may be used to directly derive the air/fuel ratio at a given cell.

Further, by using engine operating parameters such as engine speed (N), load, air mass (AM) or air flow, cam timing, spark timing, engine coolant temperature (ECT), etc., exhaust temperature may be inferred from a model as shown at 1414. Furthermore, the feed exhaust speciation of a cell may be inferred from a model based on engine parameters such as engine speed, load, air mass or air flow, cam timing, spark timing, engine coolant temperature, etc. as shown at 1416. Based on information from 1414, fuel cell temperature at each cell may be inferred from a model at 1420. With the cell air/fuel ratio, inferred cell temperature, inferred feed speciation, a cell space velocity, and a model of the reduction/oxidation methods of the catalytic cell, the fuel cell speciation at each cell may be inferred as shown at 1430. Thus, the exhaust speciation or exhaust information may be obtained.

In some embodiments, this approach of determining the speciation may be used to further reduce certain emissions such as NOx emissions at each cell by applying a current across the catalytic layer, the cell and/or reversing the potential across the cell as described in more details below.

Figure 4:
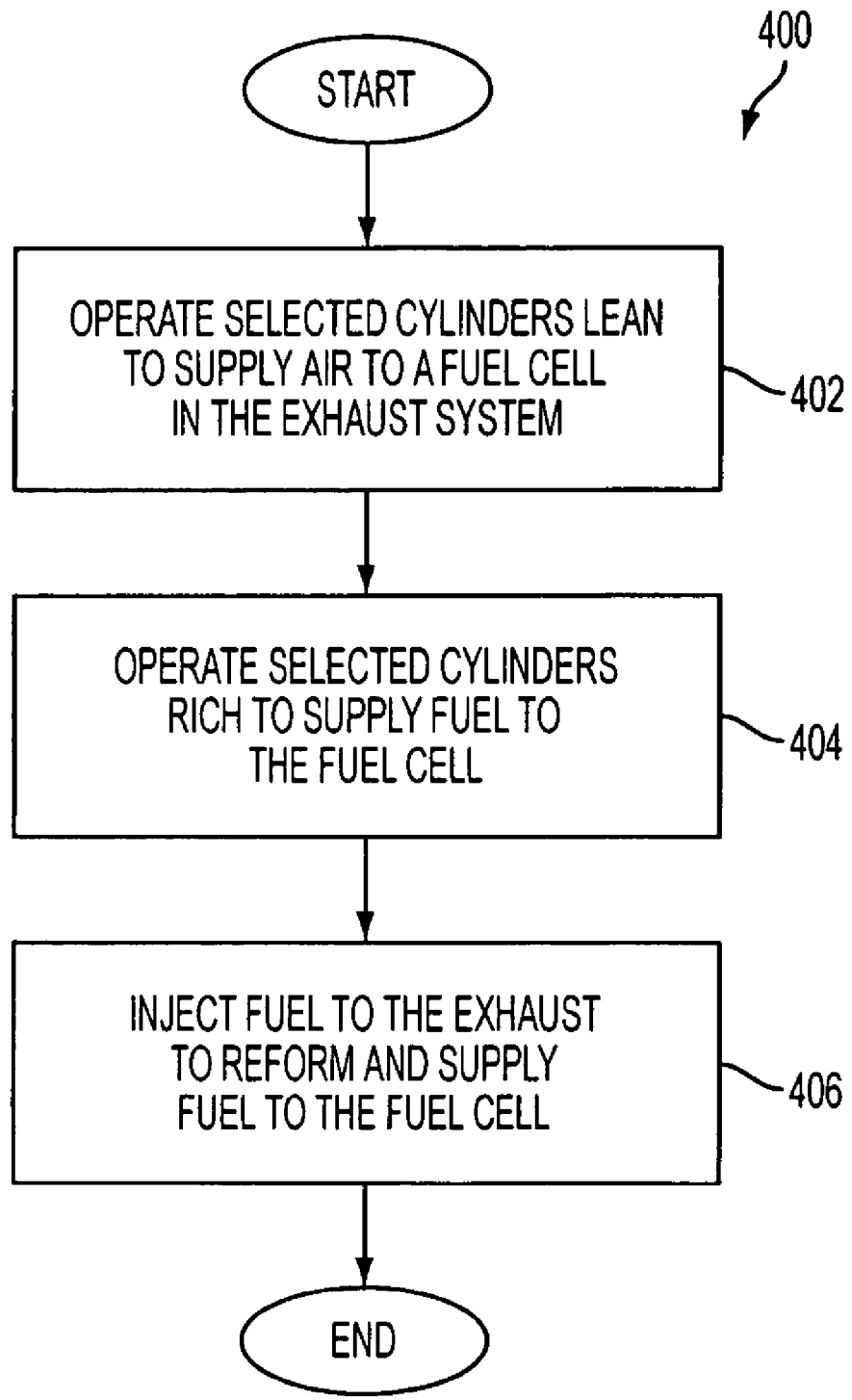
FIG. 4 is a flow diagram of one embodiment of a method of operating an engine to supply air and fuel to a fuel cell.

Referring now to FIG. 4, it illustrates an exemplary embodiment of a control method to operate an engine to supply air and fuel to a fuel cell, where some cylinders operate at a different air-fuel ratio than other cylinders during engine operation. For example, some cylinders can operate rich while other cylinders concurrently operate lean, thereby providing both air and fuel to the fuel cell. Further, it may be possible in some cases to adjust the respective lean and rich air-fuel ratios of the cylinders to supply a desired level of fuel cell power generation. However, under other conditions, the level and/or number of lean and/or rich cylinders may be varied with conditions of the fuel cell, such as generated power or current, to reduce emissions while still generating power.

Specifically, the method 400 includes, at 402, operating selected cylinders lean to supply air to a fuel cell downstream of an exhaust system of an engine. When the selected cylinders operate lean, the exhaust may contain oxygen, thus providing oxygen for the reaction in the fuel cell.

In some embodiments, the selected cylinders may be a group of cylinders in one bank of the engine. In one embodiment, the selected cylinders are operated in an injector cutout mode without fuel injection. Alternatively, the selected cylinders may be used to supply power to the vehicle by combusting fuel following a cold start. Then, after the fuel cell is warm and active, these cylinders may be operated in a fuel cut mode to supply air to the fuel cell. Further, the number of cylinders operated lean or without injected fuel may be varied based on exhaust temperature, conditions of the fuel cell, desired engine output, or others.

Thus, in some embodiments, selected engine cylinders may be used as an air pump to supply air to the fuel cell. In one embodiment, the selected cylinders may have different configuration from the primary cylinders in the engine. For example, the cylinders may have different displacement or piston structure. In another example, the cylinders may not be equipped with a fuel supply, ignition source, and/or variable valve timing.

Next, the method 400 includes, at 404, operating selected cylinders rich to supply fuel to the fuel cell. In some embodiments, the selected cylinders may be in one bank of the engine. Alternatively, the cylinders may be randomly selected to operate rich, where the number or sequencing of such cylinders can vary with operating conditions such as temperature, fuel cell conditions, or others.

Next, the method 400 includes, at 406, injecting fuel to the exhaust system to reform and supply fuel to the fuel cell, if desired. Under some operating conditions, the engine is unable to provide sufficient hydrogen and carbon monoxide for the fuel cell. The method 400 approaches this situation by injecting fuel into the exhaust system to reform and supply fuel. In some embodiments, fuel may be injected into the exhaust manifold along with some amount of air. In one embodiment, this air may be diverted from the fuel cell air supply such as an air pump. In another embodiment, this air may be supplied by running the engine leaner. Such injected fuel may be reformed into hydrogen and/or carbon monoxide suitable for reactions in the fuel cell using heat from the exhaust manifold, for example.

In some embodiments, steam or water vapor may be mixed with fuel and air in the exhaust system to enhance the fuel reformulation. In one embodiment, the engine exhaust manifold may be configured to have a large volume and be insulated to maintain high temperature. In this way, the exhaust manifold may be served as a thermal reactor for fuel reformation. Alternatively, with a direct injection engine, fuel may be injected into selected cylinders during the exhaust stroke. In some embodiments, the selected cylinders may be in one bank of the engine, and the number of cylinders operated with late injection during the exhaust stroke, and/or the amount of late injection, may be varied with fuel cell operating conditions, such as generated power or current, and exhaust conditions, such as temperature. Alternatively, the cylinders may be randomly selected to perform fuel injection during the exhaust stroke, or varied in a preselected pattern. The high temperature after a power stroke may favor the reformation of fuel in the cylinder, under some conditions, thus providing improved performance with late injection. Further, fuel reformation may continue in the exhaust manifold to increase the amount of reformed fuel.

The above method has various advantages. For example, some engine cylinders can be used as an air pump to supply desired oxygen to the fuel cell. Thus, in one embodiment, it may be possible to eliminate, or supplement, an air pump in providing oxygen to the fuel cell, thus reducing system cost. In some embodiments, the operation of cylinders at a lean or injector cut-out condition may provide additional air to the exhaust and fuel cell in the event the air pump degrades. Further, under conditions where the air pump may supply insufficient oxygen, the above operation may also be used to supplement air.

Further, in some embodiments, since some cylinders of engine operate rich, they may supply the required fuel to the fuel cell. Additionally, fuel injection to the exhaust system may provide additional fuel when the engine is unable to provide sufficient fuel to the fuel cell, for example. Further, with a direct injection engine, since fuel can be injected during the exhaust stroke, a separate fuel injector may not be needed. Thus, in some embodiments, the cost for a separate fuel supply system and reformer may be avoided or reduced via late injection supplementing separate exhaust injection.

Figure 5:
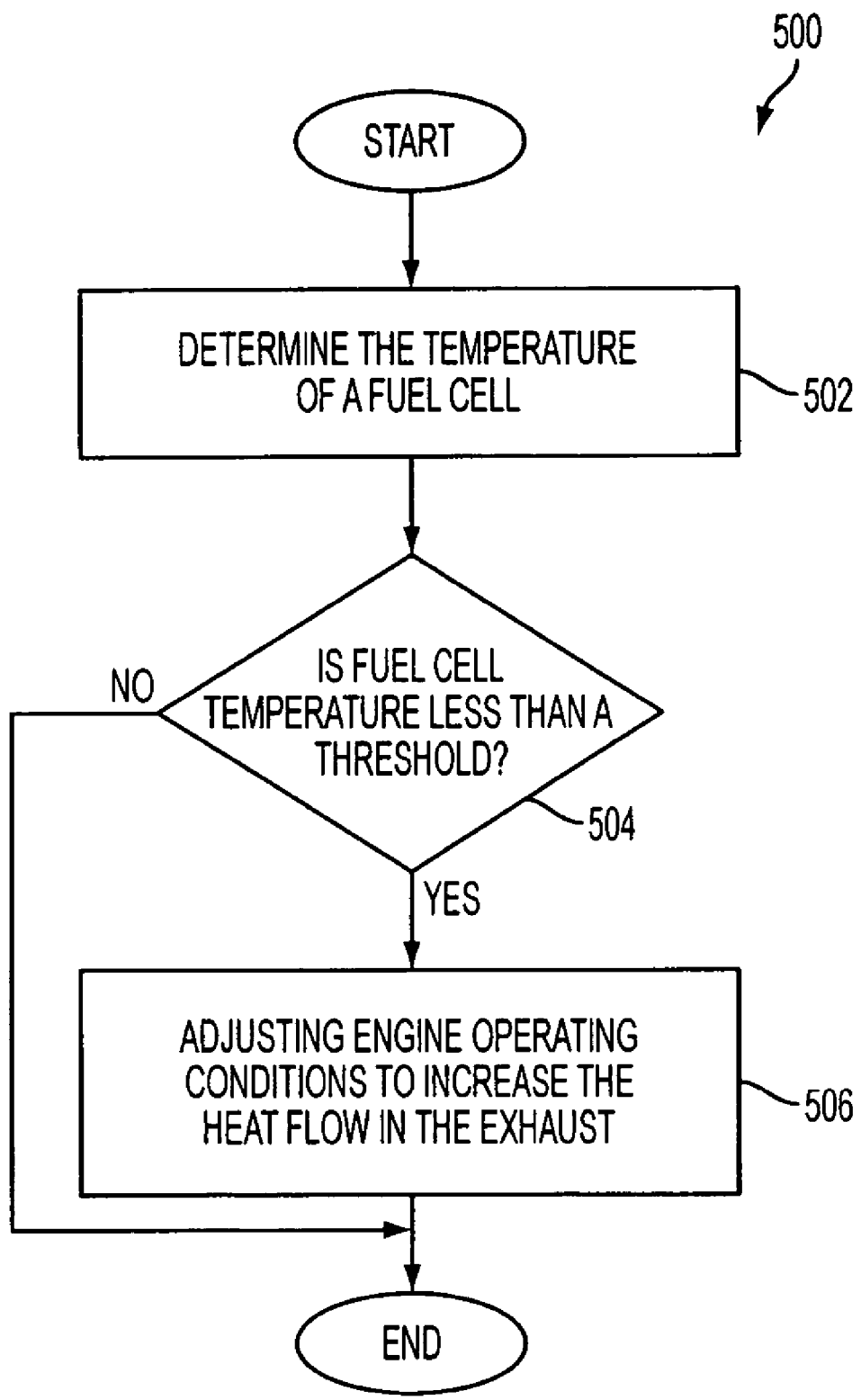
FIG. 5 is a flow diagram of one embodiment of a method of an engine operation to increase the temperature of an exhaust entering a fuel cell.

Referring now to FIG. 5, it shows a flow diagram of one embodiment of a method of engine operation to increase the temperature of an exhaust entering a fuel cell. Specifically, the method 500 includes, at 502, determining the fuel cell temperature. Next, the method compares the temperature with a threshold at 504. The threshold may be at or above a minimum temperature at which the fuel cell is able to function at a specified performance level. If the temperature is determined to be greater than the threshold at 504, then no action is required. If the temperature is determined to be less than the desired value at 504, then the method includes, at 506, adjusting engine operating conditions to increase the heat flow in the exhaust. In some embodiments, the heat output of the engine may be increased by operating the engine with a more retarded spark timing in conjunction with a larger air/fuel flow (to maintain torque). Alternatively, the engine may be operated rich and air may be injected into the exhaust stream. In one embodiment, the injected air may be air diverted from the pump used to supply the fuel cell. In another embodiment, some cylinders can operate rich and some cylinders can operate lean. In this way, the combustion products from the rich operation of the engine may react with air in an exothermal reaction to release heat and increase temperature.

As described above, the temperature of a fuel cell may be maintained in a selected range for desired operation. When the engine serves as a heat source for a fuel cell, it can take time to heat the fuel cell to the desired operating temperature under some conditions such as cold start, or deceleration fuel shut off. By performing the routine 500, the fuel cell temperature may be raised quickly to a temperature range desired for the desired operation of the fuel cell.

Figure 6:
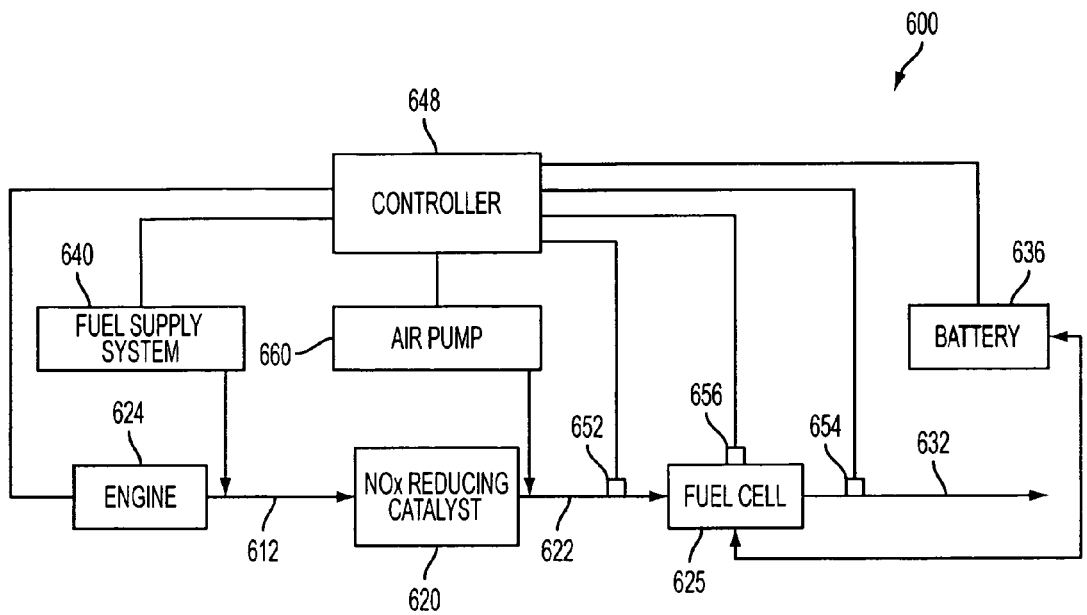
FIG. 6 is a schematic diagram of one embodiment of an engine system with fuel cell and catalyst.

Referring to FIG. 6, it shows a schematic diagram of one embodiment of an engine system with fuel cell and catalyst. As shown in FIG. 6, NOx reducing catalyst 620 is disposed in the engine exhaust passage 612 downstream of engine 624 and upstream of the fuel cell 625. Exhaust exiting NOx reducing catalyst enters fuel cell 625 through passage 622. Fuel cell 625 is electrically communicated with battery 636.

An air/fuel ratio sensor 652 is shown to be placed before fuel cell 625 and an air/fuel ratio sensor 654 is shown to be placed after fuel cell 625. Sensors 652 and 654 may be HEGO sensor, Universal Exhaust Gas Oxygen (UEGO), or other air/fuel ratio sensors. Alternatively, a two-state exhaust gas oxygen sensor may be substituted for sensors 652 and 654.

Fuel cell temperature may be measured by temperature sensor 656, and/or estimated based on operating conditions such as engine speed, load, air temperature, engine temperature, and/or airflow, or combinations thereof.

Engine controller 648 receives signals from sensors in addition to signals described above in conjunction with FIG. 2.

In the embodiment illustrated in FIG. 6, fuel may be added to the engine exhaust by fuel supply system 640. Alternatively, fuel may be added to the exhaust manifold or may be injected into a cylinder during the exhaust stroke if the engine is a direct injection engine. In some embodiments, the engine may operate in a rich mode and may provide all fuel required for the operation of fuel cell 625.

Similarly, air required for fuel cell 625 may be supplied by air pump 660. Alternatively, the engine may be operated in a way to supply the required air. For example, as described above, the air pump may be selected cylinders or a designated cylinder of engine 624, where the cylinder may operated in a fuel cut state. In some embodiments, air may be supplied by engine having selected cylinders running lean.

The engine may operate rich during power cogeneration with the fuel cell. In the rich operating mode, there can be relatively low emissions of NOx. In the illustrated embodiment, NOx reducing catalyst 620 is disposed downstream of engine exhaust and upstream of fuel cell 625. NOx reducing catalyst may be a NOx catalyst or a lean NOx trap. On the NOx reducing catalyst, NOx can be reduced to $N_2$ and $O_2$ while unburnt fuel, reformed fuel, CO, $H_2$, etc. pass through to enter fuel cell 625.

In the fuel cell, CO, $H_2$, and HC are oxidized into $CO_2$ and $H_2O$. Therefore, through proper control of its operating conditions, the fuel cell may reduce CO, $H_2$, and HC emissions to a desirable level. Specifically, the oxidation reactions in the fuel cell may be controlled by adjusting air/fuel ratio of engine based on sensor 650 and/or sensor 652, as well as conditions of the fuel cell and other operating conditions. Various example control strategies are described in more detail below.

In some embodiments, a platinum group metal (PGM) may be incorporated into fuel cell 625 to enhance the oxidation efficiency of fuel cell. PGM may be platinum, palladium, or other precious metals. In such a configuration, CO, $H_2$, and HC may be oxidized in the reactions on the surface of PGM in addition to the reactions at the electrodes of the fuel cell.

The system described above may have various advantages. For example, NOx emissions are reduced in the NOx reducing catalyst specifically designed for NOx removal. Thus, the catalyst may be optimized to enhance the NOx removal efficiency. Further, when the engine operates rich, the NOx reducing catalyst is in the oxygen deficient environment. Thus, the NOx reduction reaction can be favored. Furthermore, since the NOx reduction reaction can be an exothermic reaction, having a NOx reducing catalyst upstream of fuel cell can be advantageous for the operation of fuel cell. For example, the heat released from the exothermic reaction may raise the temperature of the fuel cell to a level that gives improved fuel cell operation. Additionally, since the temperature in NOx reducing catalyst 620 and exhaust passage 622 is higher, more fuel may be reformed when unburnt fuel from the engine and/or fuel supply system pass through NOx reducing catalyst 620 and exhaust passage 622.

It should be appreciated that an emissions control device to control NOx may be eliminated in some embodiment if NOx emissions resulting from rich operation can meet the emission standard, or if other approaches may be used to meet regulated emission levels.

Additionally, the fuel cell may serve as an emission control device to decrease CO, $H_2$, HC emissions by oxidizing them into $CO_2$, $H_2O$ while generating power. Thus, it may be possible to eliminate oxidizing catalysts or three way catalyst converters.

Figure 7:
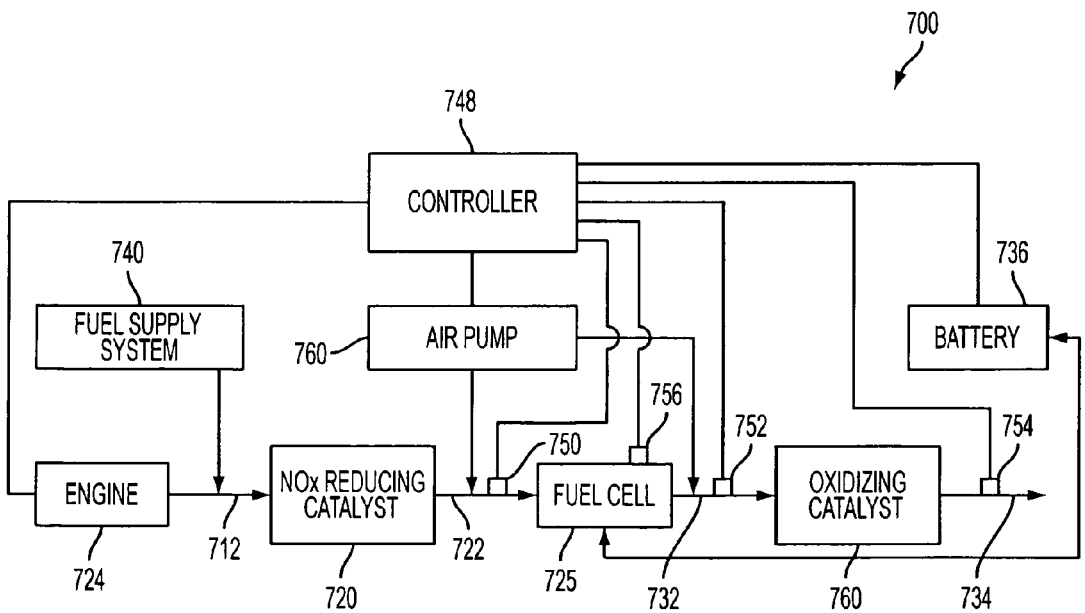
FIG. 7 is a schematic diagram of another embodiment of an engine system with fuel cell and catalysts.

FIG. 7 is a schematic diagram of another embodiment of emission reduction system. The system comprises engine 724, NOx reducing catalyst 720 downstream of engine 724, fuel cell 725 downstream of NOx reducing catalyst 720, and oxidizing catalyst 760. NOx reducing catalyst 720 communicates with engine 724 via exhaust passage 712. Fuel cell 725 communicates with NOx reducing catalyst 720 through exhaust passage 722 and communicates with the oxidizing catalyst via exhaust passage 732. The system further comprises fuel supply system 740 supplying fuel to fuel cell 725, and air pump 760 supplying air to fuel cell 725 and oxidizing catalyst 760. Fuel cell 725 electrically communicates with battery 736. Optionally, sensors 750 and 752 are placed before and after fuel cell 725, and sensor 754 is placed after oxidizing catalyst. The sensors send exhaust information to controller 748 which controls operations of the system.

The embodiment depicted in FIG. 7 is similar to the embodiment depicted in FIG. 6, however, the embodiment of FIG. 7 includes the addition of oxidizing catalyst 760 downstream of fuel cell 725 and the supply of air to oxidizing catalyst 760. Oxidizing catalyst 760 can be beneficial in that it may further reduce CO, $H_2$, HC emissions passing through fuel cell 725 unreacted. Alternatively, a three way catalyst converter (TWC) may be used in place of oxidizing catalyst 760 to reduce emissions of NOx, CO, $H_2$, HC, etc. In such a configuration, a sensor such as oxygen sensor may be placed in the TWC. Thus, exhaust information in the TWC may be sent to controller in time for the adjustment of engine operation.

Figure 8:
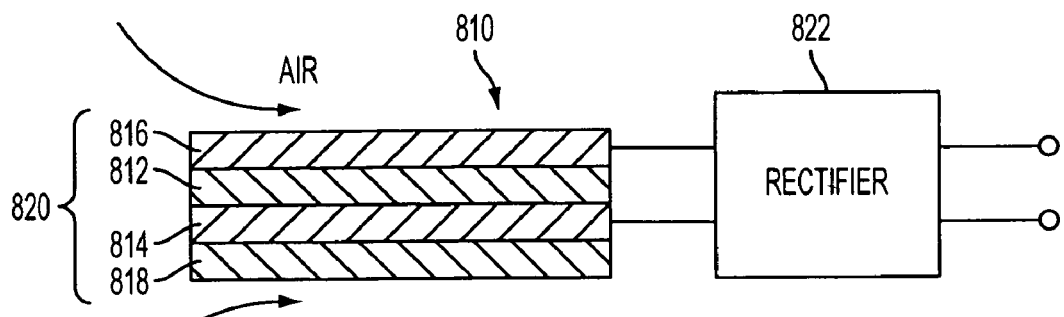
FIG. 8 is a schematic diagram of an exemplary embodiment of a catalytic device comprising a fuel cell portion and a catalytic conversion portion.

FIG. 8 shows an internal structure of an exemplary embodiment of a catalytic device. The internal structure may be a combination of a fuel cell and a catalyst. The catalytic device includes an internal structure having a fuel cell portion and a catalytic conversion portion. FIG. 8 shows a schematic diagram of an exemplary embodiment of an internal structure 810 of a catalytic device. Internal structure 810 has a fuel cell portion and a catalytic conversion portion. Internal structure 810 includes a support 812, an anode 814 supported by a first surface of support 812, a cathode 816 supported by a second surface of support 812, and a catalytic conversion structure 818 supported by the first surface of support 812. FIG. 8 shows anode 814 and cathode 816 disposed on opposite sides of support 812, and catalytic conversion structure 818 disposed on anode 814. However, it will be appreciated that other intermediate layers between these layers may be used. Furthermore, it will be understood that catalytic conversion structure 818 may be disposed over only portions of anode 814, or may substantially cover anode 814. Likewise, anode 814 and cathode 816 may each completely cover the respective support surfaces, or only partially cover the support surfaces. Additionally, while the term "internal structure" is used to describe the structure forming and/or supporting the fuel cell and catalytic conversion structures, it will be appreciated that at least portions of the internal structure 810 may be exposed to the atmosphere outside of the catalytic device, as described in more detail below.

Support 812, anode 814, and cathode 816 cooperate to form a fuel cell structure 820 for generating an electrical potential from unoxidized and/or partially oxidized exhaust components supplied to anode 814, in combination with oxygen (or other oxygen-containing oxidant) supplied to cathode 816. Examples of exhaust components that may be used as fuel by fuel cell structure 820 include, but are not limited to, hydrogen, carbon monoxide, and unoxidized and partially oxidized hydrocarbons.

Catalytic conversion structure 818 may be configured to be porous or otherwise permeable by exhaust gases so that such exhaust gases may reach those portions of anode 814 covered by catalytic conversion structure 818 for consumption by fuel cell structure 820. Furthermore, catalytic conversion structure 818 may help to reform hydrocarbons in the exhaust, thereby forming more fuel for fuel cell structure 820. Catalytic conversion structure 818 additionally may oxidize any hydrogen, carbon monoxide, hydrocarbons, and other oxidizable exhaust components not consumed by fuel cell structure 820, and also may be configured to reduce $NO_x$ emissions. In this manner, catalytic conversion structure 818 and fuel cell structure 820 may cooperate to generate an electrical potential from exhaust gases and to reduce the concentration of undesirable emissions in the exhaust from engine 24.

The use of the catalytic device with the internal structure described in FIG. 8 may offer various advantages over the use of separate oxidative catalytic devices and fuel cells in an emissions system. For example, in applications where a catalytic converter is separated from a fuel cell along an exhaust system, heat produced by the catalytic reactions within the catalytic conversion device may be lost. In contrast, the configuration of fuel cell structure 820 and catalytic conversion structure 818 may allow heat produced by catalytic conversion structure 818 to be used to heat fuel cell structure 820. This may be helpful, as the thermal energy that would otherwise be wasted in a conventional catalytic converter system may be used to heat fuel cell structure 820 to its ordinary operating temperatures, which may be on the order of 800-1000 degrees Celsius for some types of fuel cell such as SOFC. Furthermore, the use of catalytic device may help to reduce the number of components used in an emissions system relative to the use of a separate catalytic converter and fuel cell.

Engine 24 may be operated in such a manner that the engine produces alternating periods of rich and lean exhaust. Such an oscillation of the air/fuel ratio is often used, for example, with three-way catalysts for ordinary catalyst operation. In the context of catalytic device with internal structure 810, periods of rich exhaust may be used to supply fuel to fuel cell structure 820, and periods of lean exhaust may be used to increase the oxygen content of catalytic conversion structure 818 to facilitate the catalytic oxidation of exhaust components. In some embodiments, the oscillation of the air/fuel ratio may be conducted substantially symmetrically about the stoichiometric point, while in other embodiments the air/fuel ratio may be oscillated about a midpoint offset from the stoichiometric point, either to the rich side or lean side of stoichiometry. Oscillating the air/fuel ratio about a midpoint richer than the stoichiometric point may provide more fuel in the form of unoxidized and partially oxidized exhaust products to fuel cell structure 820 relative to oscillating the air/fuel ratio about the stoichiometric point or a leaner ratio.

In some embodiments, a rectifier 822 may be used to smooth the output of fuel cell structure 820. Rectifier 822 may be used, for example, in embodiments in which an oscillating or otherwise variable air/fuel ratio is used to operate engine 24, as the oscillation of the air/fuel ratio may produce an uneven fuel cell output. Any suitable rectification circuit or circuits may be used as rectifier 822. Suitable circuits include circuits configured to output a suitable voltage and/or current for a desired application. For example, rectifier 822 may include one or more diodes or like circuit elements to help prevent reversal of current flow in the event of variations in exhaust composition.

Any suitable material may be used as support 812. For example, in some embodiments, support 812 may be made at least partially of a solid electrolyte material capable of conducting oxygen ions between cathode 816 and anode 814. In other embodiments, support 812 may be made from a material that is not ionically conductive, but that is coated with an ionic conductor such that an ionically conductive path exists between cathode 816 and anode 814. In yet other embodiments, support 812 may be formed from more than one ionically conductive material. Examples of suitable ionically conductive materials for support 812 may include, but are not limited to, zirconium oxide-based materials. Support 812 may have a honeycomb-like structure typically used in the construction of three-way catalytic converters, or may have any other suitable structure.

Likewise, anode 814 and cathode 816 may be formed from any suitable material or materials. Suitable materials for use as anode 814 and cathode 816 include materials having similar thermal expansion characteristics as support 812, as internal structure 810 of a catalytic device may undergo thermal cycling from very cold temperatures (for example, while engine 24 is at rest in a cold climate) to the very hot temperatures often used to operate solid oxide fuel cells. As a prophetic example, it may be possible to use materials similar in design to EGO, UEGO, NOx sensors, where the thermal expansion rates of the materials are selected so as to reduce or eliminate the transfer of species from the anode and cathode layer. This is because, for example, these type of sensors are generally configured to be capable of operation under the same environmental conditions as a solid oxide fuel cell.

Catalytic conversion structure 818 also may be formed from any suitable material or materials. Suitable materials include, but are not limited to, conventional three-way catalytic wash coats. Such wash coats may include, but are not limited to, barium and cerium as well as platinum group metals including, but not limited to platinum, palladium and rhodium.

Catalytic device with internal structure 810 may include a structure for preventing oxidant and fuel from reaching the incorrect electrodes. For example, support 812 may have a honeycomb-like interior configuration, and a continuous outer surface formed at least partially from an ionically conductive material (or coated with an ionically conductive material) surrounding the honeycomb material, thereby containing exhaust gases within the honeycomb material. In these embodiments, anode 814 may be deposited over internal surfaces of support 812, and cathode 816 may be deposited over the outside face of the continuous outer surface of support 812. Exhaust from engine 24 may be directed into the internal portions of support 812, and the continuous outer surface of the support may prevent the exhaust from reaching cathode 816.

Figure 9:
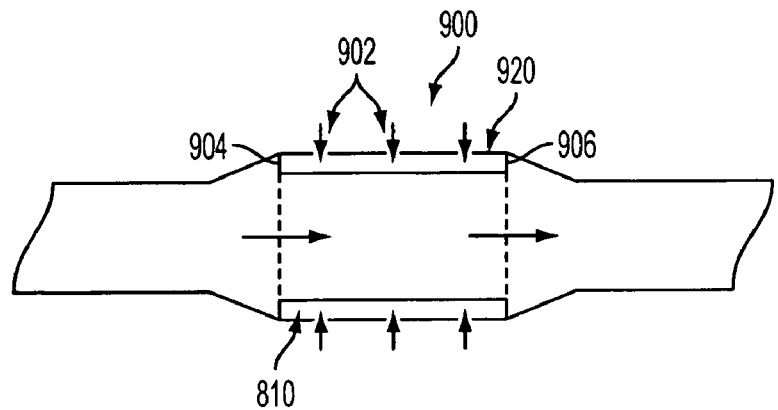
FIG. 9 is a schematic view of an exemplary embodiment of a catalytic device comprising a fuel cell portion and a catalytic conversion portion, illustrating a first exemplary oxidant inlet.

Catalytic device with internal structure 810 may be configured to provide oxidant to cathode 816 in any suitable manner. For example, the catalytic device may be configured to provide air to cathode 816. FIG. 9 shows a schematic depiction of a structure for providing ambient air to cathode 816, and for preventing air from reaching anode 814. Catalytic device 900 includes an outer casing 920 substantially enclosing internal structure 810. Outer casing 920 includes one or more openings 902 configured to allow air to reach cathode 816 disposed on the outer surface of support 812. Furthermore, a seal 904 may be provided between an upstream end of internal structure 810 and outer casing 920, thereby preventing exhaust gases from reaching cathode 816. An additional seal 906 may be provided between a downstream end of internal structure 810 and outer casing 920, thereby offering further protection against oxygen from reaching the anode and exhaust gases from reaching the cathode.

In some embodiments, a catalytic device with internal structure 810 may be configured to receive oxidant gases from a source other than ambient air. For example, in some embodiments, catalytic device may be configured to receive oxidant gases for use by cathode 816 from one or more engine cylinders that are configured to produce lean exhaust. In these embodiments, different cylinders in engine 24 may be configured to operate simultaneously at different air/fuel ratios.

Figure 10:
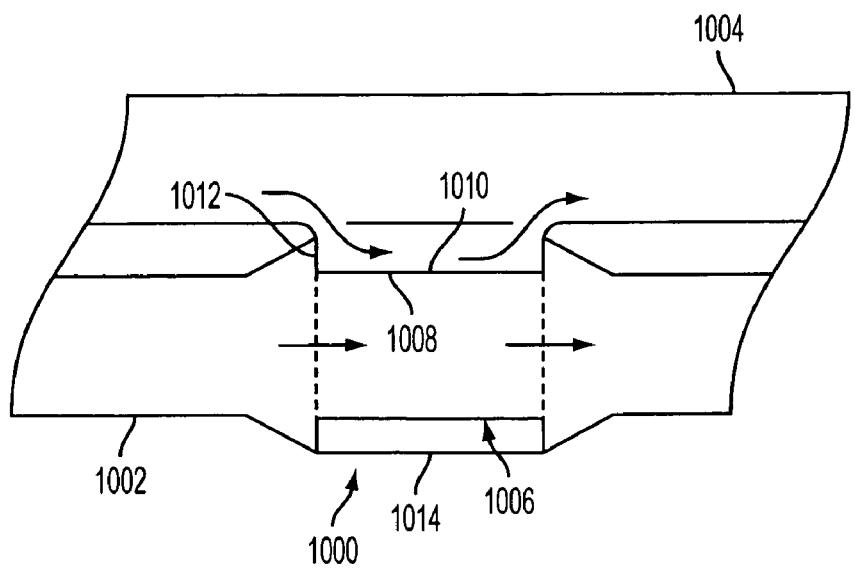
FIG. 10 is a schematic view of an exemplary embodiment of a catalytic device comprising a fuel cell portion and a catalytic conversion portion, illustrating a second exemplary oxidant inlet.

FIG. 10 shows, generally at 1000, a schematic depiction of an embodiment of a catalytic device configured to receive oxidant gases from one or more engine cylinders. Catalytic device 1000 is configured to receive exhaust from a first exhaust conduit 1002 for providing a first input to a first electrode, and exhaust from a second exhaust conduit 1004 for providing a second input to a second electrode. An internal structure 1006 includes a fuel cell structure and a catalytic conversion structure, as described above in the context of the embodiment of FIG. 8. The first electrode (not shown) is formed on or adjacent to (or is otherwise supported by) an interior surface 1008 of internal structure 1006, and the second electrode (not shown) is formed on or adjacent to (or is otherwise supported by) an outer surface 1010 of internal structure 1006.

In some embodiments, the first input from first exhaust conduit 1002 may be exhaust from rich-burning cylinders and the second input from second exhaust conduit 1004 may be exhaust from lean-burning cylinders. In these embodiments, the first electrode may be an anode and the second electrode may be a cathode.

In other embodiments, the first input from first exhaust conduit 1002 may be exhaust from lean-burning cylinders and the second input from second exhaust conduit 1004 may be exhaust from rich-burning cylinders. In these embodiments, the first electrode may be a cathode and the second electrode may be an anode. In either case, a seal 1212 may be provided between an upstream end of internal structure 1006 and an outer casing 1014 to prevent exhaust gases from first exhaust conduit 1002 from reaching the second electrode adjacent to outer surface 1010 of structure 1006, and to prevent exhaust gases from second exhaust conduit 1004 from reaching the first electrode adjacent to interior surface 1008.

Furthermore, casing 1014 may be configured to contain exhaust gases such that exhaust gases that flow into catalytic device 1000 through second exhaust conduit 1004 and that are not consumed by the fuel cell structure flow out of casing 1014 through second exhaust conduit 1004. Additional catalytic devices may be disposed in second exhaust conduit 1004 and/or first exhaust conduit where desired. It will be appreciated that a catalytic conversion structure (for example, a three-way catalyst wash coat) may be disposed partially or fully over either of the first electrode on interior surface 1008 of internal structure 1006, and/or over the second electrode on the exterior surface 1010 of internal structure 1006.

It should be appreciated that an engine having catalytic device 1000 may be operated using control method 400 as illustrated in FIG. 4 and corresponding description above. In one embodiment, first conduit 1002 or second conduit 1004 may be connected to a cylinder that is used as an air pump to supply air to the fuel cell.

In addition to advantages described above, the catalytic devices depicted in FIGS. 8-10 may save cost and provide flexibility for exhaust system design. For example, in one embodiment, since the catalytic device may function as both fuel cell and catalyst, it may replace separate fuel cells or separate catalysts such as those illustrated in FIG. 6 or FIG. 7, for example.

Figure 11:
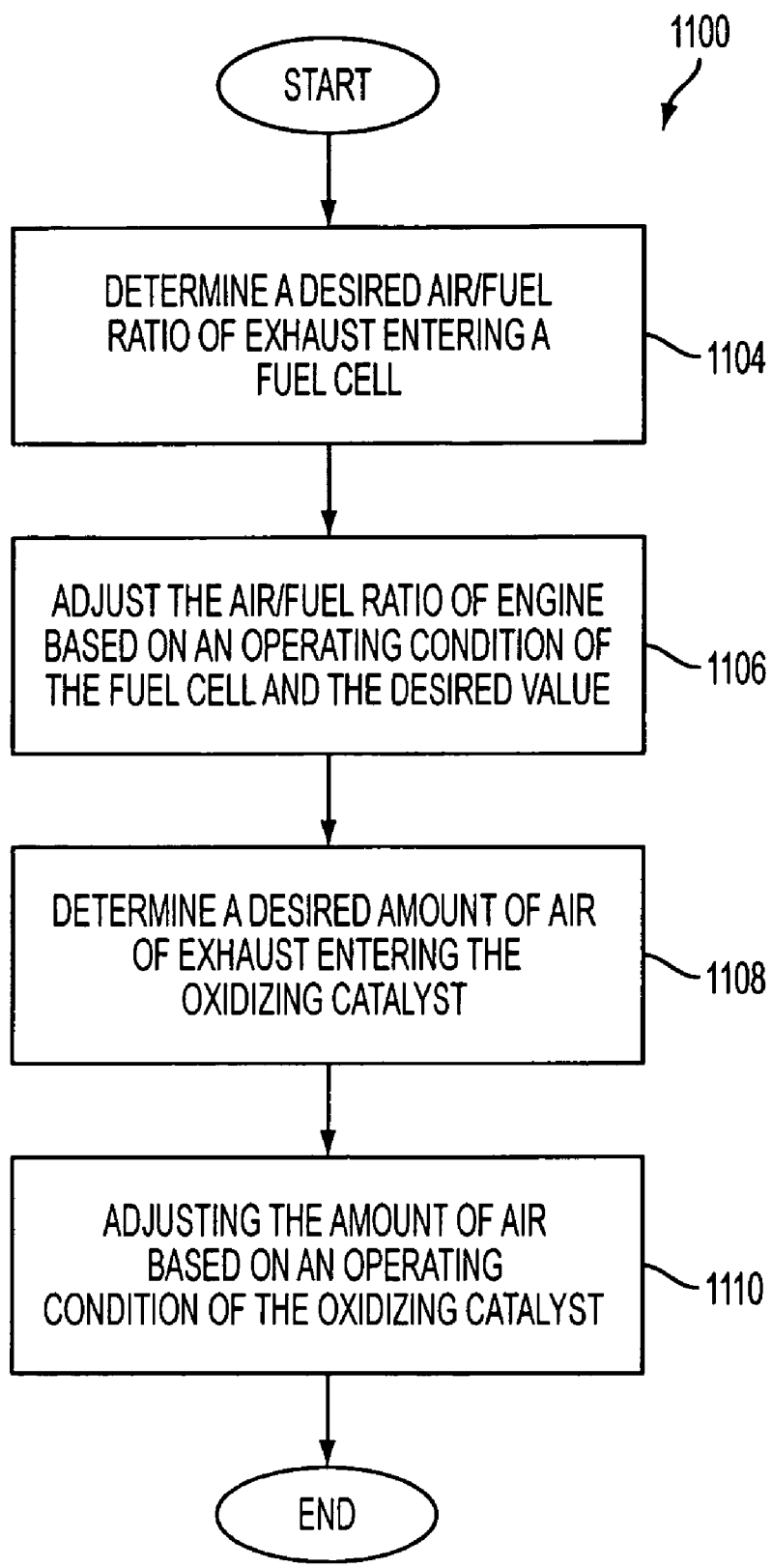
FIG. 11 is a flow diagram of one embodiment of a method to control the emissions by adjusting air/fuel ratio of an engine.

FIG. 11 is one embodiment of a method or routine to control emissions using operating conditions of the fuel cell. The method includes, at 1104, determining a desired air/fuel ratio of exhaust entering the fuel cell, where the air/fuel ratio can be proportional to oxidant/reductant ratio. Thus, controlling the air/fuel ratio enables control of the oxidant/reductant ratio, at least under some conditions. In some embodiments, the desired air/fuel ratio may be determined based on actual performance of the fuel cell, such as generated current or voltage, and/or exhaust information from sensors upstream and downstream of fuel cell, for example. In addition, the desired air-fuel ratio may be based on a desired level of power generation, or based on engine or vehicle information, such as the time since an engine start, or others.

Next, the method 1100 includes, at 1106, adjusting the air/fuel ratio of the engine based on an operating condition of the fuel cell and the desired value. The operating condition of the fuel cell may be based on exhaust information which may include feedback from exhaust air-fuel ratio sensors (such as sensor upstream and downstream of the fuel cell), as well as an indication of exhaust air-fuel ratio from the fuel cell, as is described in more detail below herein with regard to FIG. 12. In some embodiments, the engine and/or exhaust air/fuel ratio may be adjusted by varying the air/fuel ratio entering the intake manifold of the engine. In other embodiments, the air-fuel ratio of the exhaust may be adjusted by varying injected air and/or fuel in the exhaust. In still another embodiment, combinations of the above adjustments may be used.

For example, in one embodiment, some cylinders may be operated rich and some cylinders may be operated lean, where the exhaust mixture air-fuel ratio of the cylinders may be adjusted by varying the lean and/or rich air-fuel ratio of the individual cylinders. In another embodiment, selected cylinder may be operated as an air pump without fuel injection, and by changing the number of such cylinders, the mixture air-fuel ratio may be adjusted. In still other embodiments, fuel may be injected during an exhaust stroke if the engine is a direct injection engine to adjust the exhaust air-fuel ratio. Alternatively, an air or a fuel supply system separate from the engine supply system may be used to introduce air and fuel into the exhaust.

Next, the method 1100 includes, at 1108, determining a desired amount of air in the exhaust entering the oxidizing catalyst, since oxygen can be required for the oxidation reaction in the oxidizing catalyst. The desired amount may be determined by comparing exhaust information obtained from sensors before and after the oxidizing catalyst, for example. Next, the method 1100 includes, at 1110, adjusting the amount of air entering the oxidizing catalyst to the desired value based on an operating condition of the oxidizing catalyst. The amount of air may be adjusted by mixing air from a fuel cell air pump with the exhaust from the fuel cell. The fuel cell air pump may be a pump separate from engine air supply. Alternatively, selected cylinders operating lean may provide air. In some embodiments, the combined engine and fuel cell exhaust streams may be mixed with air before entering the oxidizing catalyst or in the oxidizing catalyst.

Alternatively, a TWC may be used in place of oxidizing catalyst. The reactions in the TWC may also be controlled by adjusting the amount of air entering the TWC.

This approach can provide various advantages, such as in the case where the engine may be operated dependent on an operating condition of the fuel cell. In one embodiment, the engine air-fuel ratio may be adjusted based on information from the fuel cell indicative of exhaust air/fuel ratio of the exhaust before, in, or after the fuel cell. Specifically, by adjusting the air/fuel ratio of the engine in this way, the emissions from the fuel cell may be decreased, and/or the power generation of the fuel cell may be increased. In other words, while the engine operates as a primary power source, the engine may also be adjusted so that the emissions may be sufficiently controlled in a fuel cell.

Figure 12:
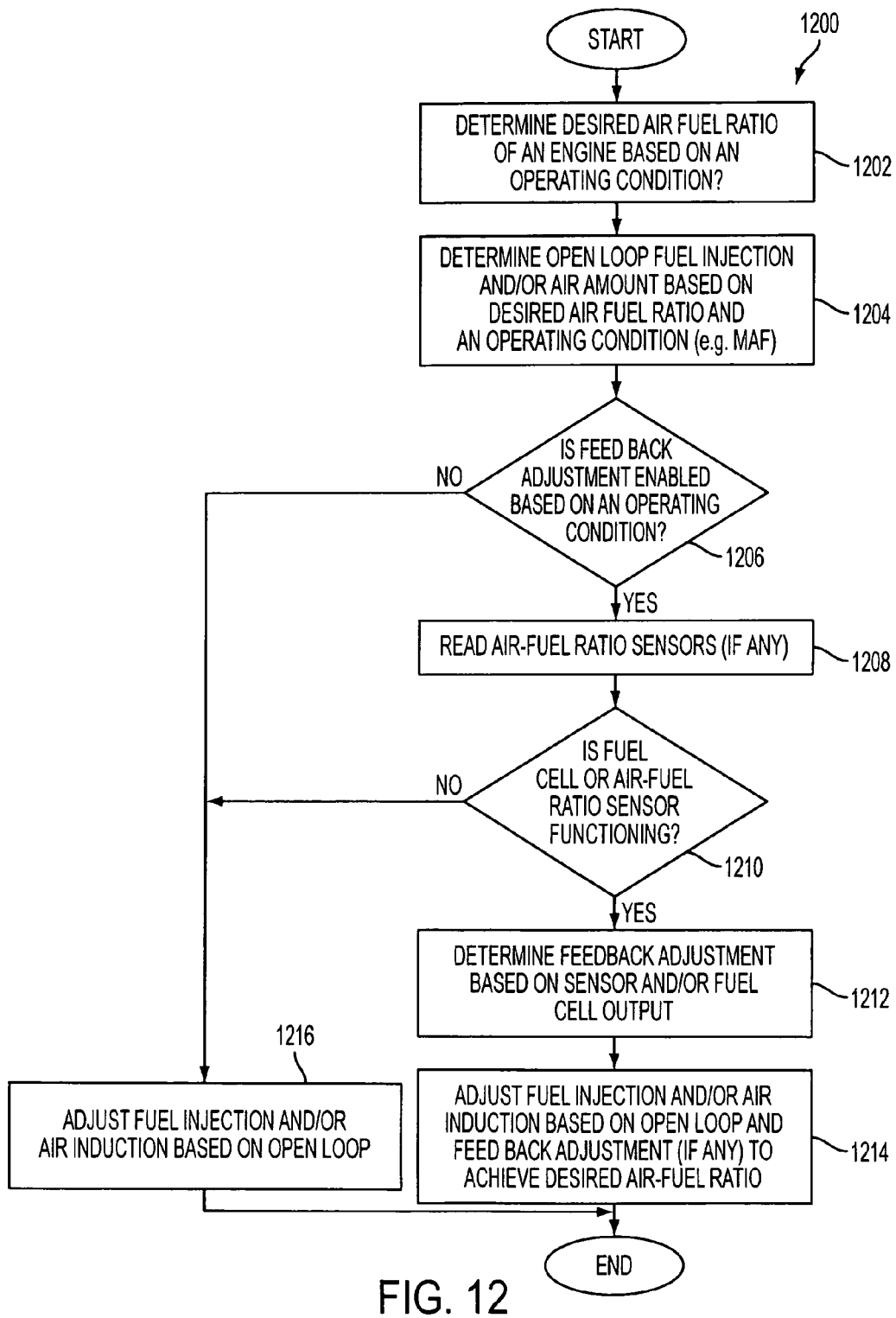
FIG. 12 is a flow diagram of one embodiment of a method of using a fuel cell as air/fuel ratio sensor.

Referring to FIG. 12, it shows one embodiment of an exemplary method or routine to control engine operation based on an air/fuel sensor and/or information from a fuel cell indicative of air-fuel ratio. The method 1200 includes, at 1202, determining a desired air/fuel ratio of an engine based on an operating condition. The operation conditions may be the operating conditions of the engine, transmission, or catalyst. Next, the method 1200 includes, at 1204, determining open loop fuel injection and/or air amount based on the desired air fuel ratio and operating condition, e.g. manifold air flow (MAF).

Next, the method 1200 includes, at 1206, determining if a feedback adjustment is enabled based on an operating condition. If the answer is no, the routine adjusts fuel injection and air induction based on the open loop at 1216. If the answer is yes, the method 1200 includes, at 1208, reading one or more air/fuel ratio sensors if there is any in the system. The air/fuel ratio sensor may be a HEGO sensor, a UEGO sensor or other suitable sensors. Next, the method 1200 includes, at 1210, diagnosing if the fuel cell and/or air/fuel ratio sensor is functioning, such as whether it is functioning to provide information regarding a measured air-fuel ratio. If the answer is no, the routine adjusts fuel injection and air induction based on the open loop value from 1216. If the answer is yes, the method 1200 includes, at 1212, determining feedback adjustment based on the air/fuel ratio sensor(s) and/or fuel cell output(s), such as current, voltage, etc. Next, the method 1200 includes at 1214, adjusting fuel injection and/or air induction into the engine, or into the exhaust, based on open loop and feed back adjustments to achieve the desired air fuel ratio. Thus, desired air/fuel ratio may be obtained through an open loop and/or closed loop fuel injection.

Thus, the method 1200 may use the fuel cell as an air/fuel ratio sensor, among others. In one example where the fuel cell may be constructed similar to a Nernst cell, it can be used to determine the air/fuel ratio as a function of the electrical output such as current, voltage, or impedance. For example, the Nernst equation can be used in conjunction with engine speciation and temperature models to determine speciation at the fuel cell. Alternatively, the supply and exhaust speciation of the fuel cell may be inferred by supplying current to the upstream cell and observing the change in current as a result of the previous intrusive action. Therefore, the air/fuel ratio can be determined.

Note that when current is applied to the fuel cell, NOx at the anode may receive electrons and be reduced to $N_2$ and $O_2$. Thus, it may be possible to configure the fuel cell to reduce NOx by supplying approximately 5.8 kJ per mole of NOx or about 0.002 hp×hr per mol of NOx to form $N_2$ and $O_2$. The number or constant of 5.8 kJ per mole or 0.002 hp×hr per mol of NOx is the change in gibbs energy, required to disassociate NOx at atmospheric conditions, this may change depending on the environmental conditions of the cell. In some embodiments, the current may be applied across the catalytic layer and/or the fuel cell. In other embodiments, the current may be applied by reversing the potential across the cell.

Using a fuel cell as a sensor, in addition to a power generation and emission reduction device, may have various advantages. First, it may be possible to reduce a number of exhaust air/fuel ratio sensors, thus reducing system cost. Further, the fuel cell can be used as an additional air/fuel ratio sensor to supplement other air/fuel ratio sensor information. Additionally, in one embodiment, when current from a battery is applied to the fuel cell, NOx emissions can be decreased by reducing NOx to $N_2$ and $O_2$. Therefore, the fuel cell may serve multiple functions such as power generation, sensing, and/or emission control.

Further, in another embodiment, information such as voltage or current generation of the fuel cell may be used to adjust engine operation other than, or in addition to, combustion or exhaust air-fuel ratio. For example, the engine may be adjusted to vary the speciation in the exhaust to adjust fuel cell operation in response to measurement of fuel cell conditions.

Figure 13:
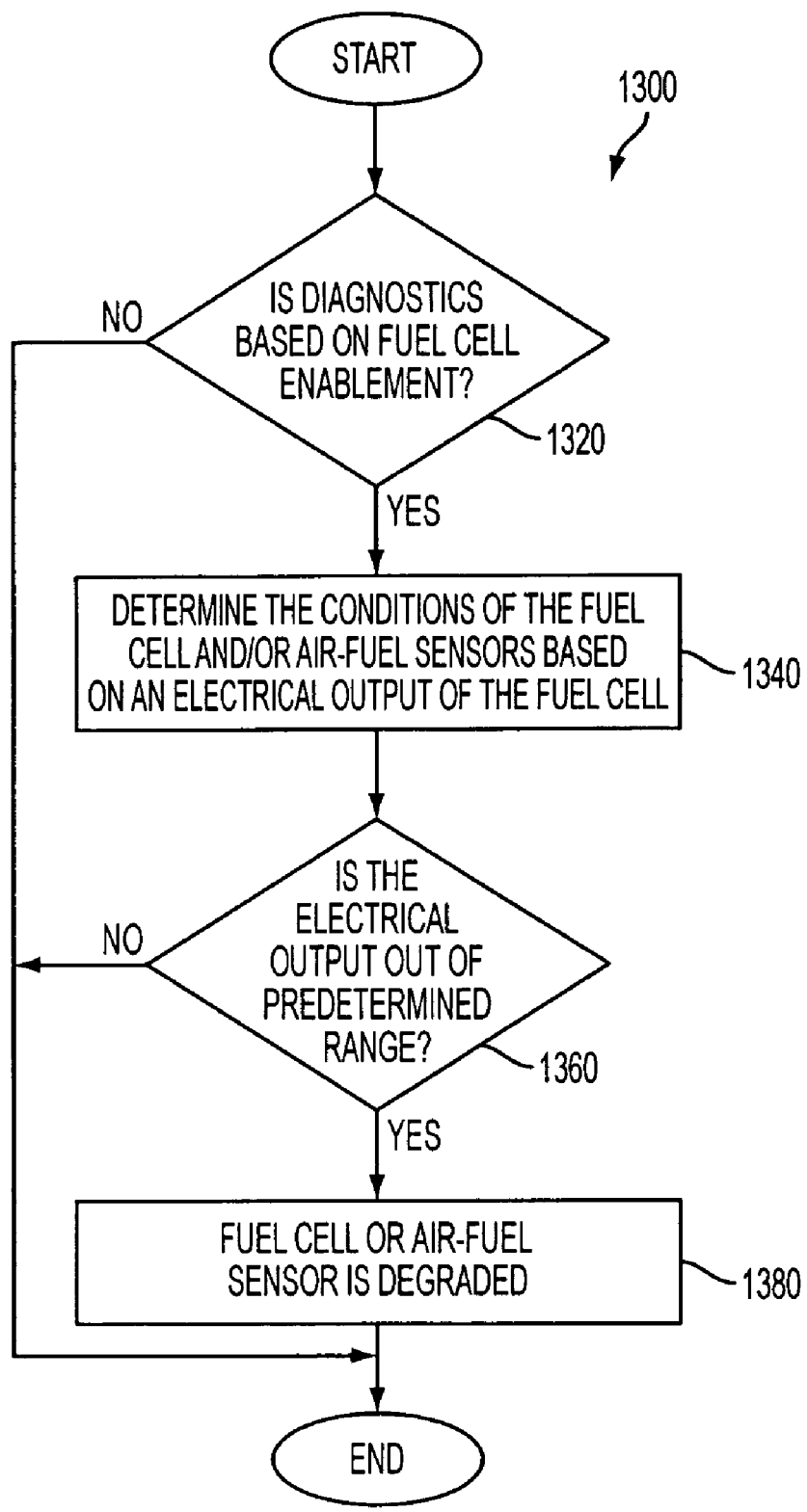
FIG. 13 is a flow diagram of one embodiment of a method to diagnose the functioning of a fuel cell and/or an air fuel ratio sensor.

FIG. 13 illustrates one embodiment of a method or routine to diagnose the functioning of an air/fuel ratio sensor and/or a fuel cell. The routine 1300 includes, at 1320, determining whether a diagnostics based on the fuel cell is enabled. If the answer is no, the diagnostic routine is ended. If the answer is yes, the routine includes, at 1340, determining the conditions of the air/fuel ratio sensors and/or fuel cell based on an electrical output of the fuel cell. Next, the routine 1300 includes, at 1360, determining whether the electrical output valves are outside a predetermined range. The predetermined range may be the range that the fuel cell and air/fuel ratio sensor are expected to be within given current operating conditions. If the answer is no, the fuel cell and air/fuel ratio sensor are deemed functioning, and the diagnostic routine ends. If the answer is yes, the routine 1300 diagnose, at 1380, that fuel cell and/or air fuel sensor is degraded.

Thus, in one example, the routine uses a condition of the fuel cell to diagnose the functionality of an air-fuel ratio sensor. In another example, the routine may use a condition of the air-fuel ratio sensor to determine the functionality of the fuel cell. The routine thus allows the fuel cell to have a diagnostic function in addition to power generation.

As will be appreciated by one of ordinary skill in the art, the specific routines and block diagrams described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 48.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various camshaft and/or valve timings, fuel injection timings, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and valve timing and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method to operate an emissions-reduction system of a vehicle, the vehicle including an engine coupled upstream of an exhaust system, a NOx reduction catalyst coupled in the exhaust system, and a fuel cell coupled downstream of the NOx reduction catalyst, the method comprising:
adjusting an air/fuel ratio in a cylinder of the engine to vary an air/fuel ratio in an exhaust of the engine in response to an operating condition of the fuel cell, where said adjusting includes generating a rich air/fuel ratio in the exhaust of the engine to concurrently reduce NOx in the NOx reduction catalyst and provide fuel to an anode of the fuel cell; and
flowing the exhaust of the engine having the rich air/fuel ratio to the NOx reduction catalyst and then to the fuel cell.

2. The method of claim 1, further comprising oxidizing a component of the exhaust in the fuel cell, wherein a platinum group metal is incorporated into an electrode of the fuel cell to enhance an oxidation reaction in the fuel cell.

3. The method of claim 1, wherein the operating condition of the fuel cell is based on feedback from a first sensor coupled upstream of the fuel cell, and wherein adjusting the air/fuel ratio comprises adjusting the air/fuel ratio in response to such feedback.

4. The method of claim 1, wherein the operating condition of the fuel cell is based on feedback from a second sensor coupled downstream of the fuel cell, and wherein adjusting the air/fuel ratio comprises adjusting the air/fuel ratio in response to such feedback.

5. The method of claim 1, wherein the cylinder is among a plurality of cylinders of the engine, and wherein adjusting the air/fuel ratio comprises operating at least one cylinder rich and operating at least one cylinder lean, and wherein exhaust from the at least one lean cylinder supplies air to a cathode of the fuel cell.

6. The method of claim 1, wherein the cylinder is among a plurality of cylinders of the engine, and wherein adjusting the air/fuel ratio comprises operating at least one cylinder as an air pump, without injecting fuel, to supply air to a cathode of the fuel cell.

7. The method of claim 1, wherein the cylinder is a direct injection cylinder, and wherein adjusting the air/fuel ratio comprises injecting fuel into the cylinder during an exhaust stroke of the cylinder.

8. A method to operate an emissions-reduction system of a vehicle, the vehicle including an engine coupled upstream of an exhaust system, a NOx reduction catalyst coupled in the exhaust system, a fuel cell coupled downstream of the NOx reduction catalyst, and an oxidizing catalyst coupled downstream of the fuel cell, the method comprising:
adjusting an air/fuel ratio in a cylinder of the engine to vary an air/fuel ratio in an exhaust of the engine in response to an operating condition of the fuel cell, where said adjusting includes generating a rich air/fuel ratio in the exhaust of the engine to concurrently reduce NOx in the NOx reduction catalyst and provide fuel to an anode of the fuel cell;
flowing the exhaust of the engine having the rich air/fuel ratio to the NOx reduction catalyst and then to the fuel cell; and
adjusting an amount of air mixed with an exhaust of the fuel cell and entering the oxidizing catalyst in response to an operating condition of the oxidizing catalyst.

9. The method of claim 8, wherein the cylinder is among a plurality of cylinders of the engine, and wherein adjusting the air/fuel ratio comprises operating at least one cylinder rich and operating at least one cylinder lean, and wherein exhaust from the at least one lean cylinder supplies the air mixed with the exhaust of the fuel cell.

10. The method of claim 8, wherein the operating condition of the oxidizing catalyst is based on information from one or more sensors associated with the oxidizing catalyst, and wherein adjusting the amount of air comprises adjusting the amount of air in response to such information.

11. The method of claim 8, wherein the oxidizing catalyst is a three way conversion catalyst.

12. The method of claim 1, wherein the operating condition of the fuel cell is based on one or more of a current and a voltage generated by the fuel cell.

13. The method of claim 12, wherein the air/fuel ratio in the cylinder is adjusted to maintain a desired exhaust air-fuel ratio based on the one or more of the current and the voltage generated by the fuel cell, and wherein the one or more of the current and the voltage represents exhaust air-fuel ratio feedback.

14. The method of claim 1, wherein the operating condition of the fuel cell is based on one or more of a temperature and an efficiency of the fuel cell.

15. The method of claim 1, wherein the operating condition of the fuel cell is based on an emission-control performance of the fuel cell.

16. The method of claim 8, wherein the air mixed with the exhaust of the fuel cell includes air from a pump.

* * * * *